O. P. ERHARDT.
BEVERAGE MIXER.
APPLICATION FILED DEC. 6, 1917.
1,407,789. Patented Feb. 28, 1922.
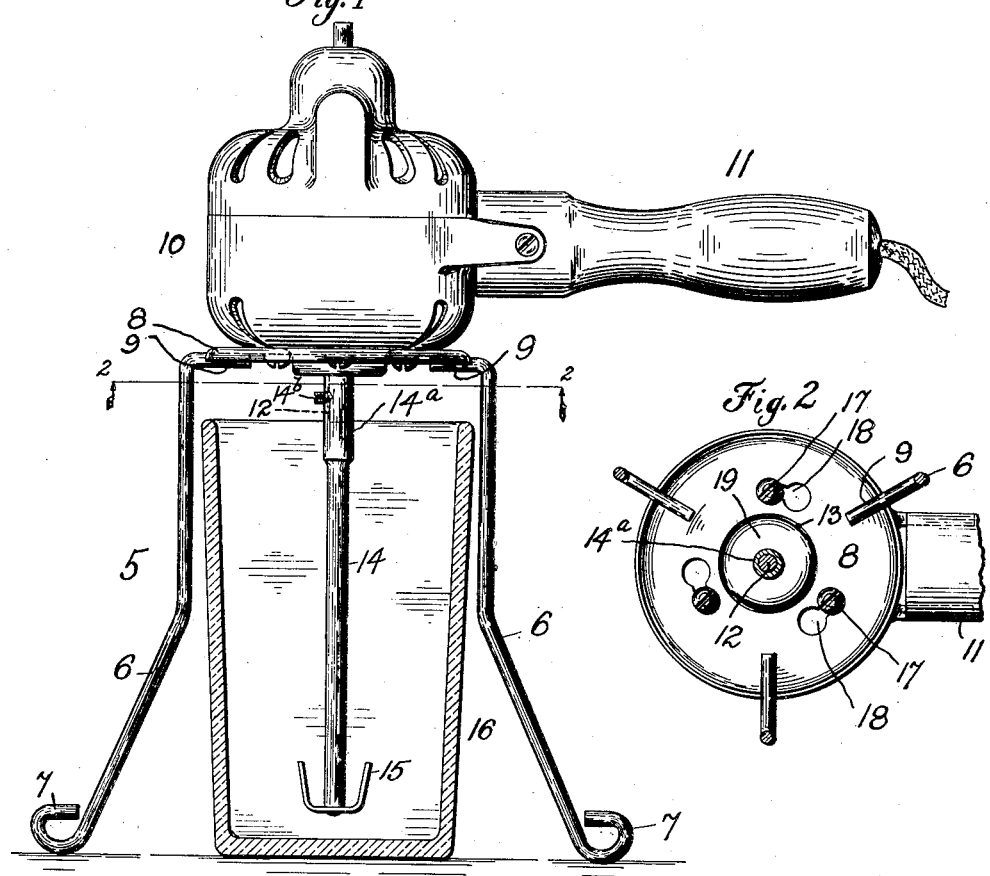
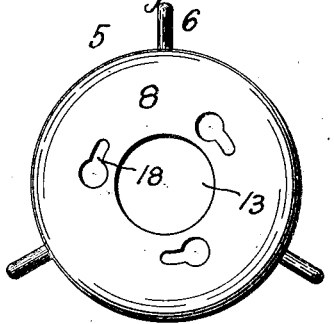
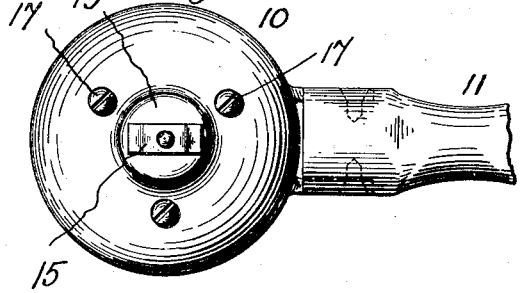
INVENTOR
Oscar P. Erhardt
BY
ATTORNEY

UNITED STATES PATENT OFFICE.

OSCAR P. ERHARDT, OF WEST HAVEN, CONNECTICUT, ASSIGNOR TO THE A. C. GILBERT COMPANY, OF NEW HAVEN, CONNECTICUT, A CORPORATION OF CONNECTICUT.

BEVERAGE MIXER.

1,407,789.                Specification of Letters Patent.    Patented Feb. 28, 1922.

Application filed December 6, 1917. Serial No. 205,791.

*To all whom it may concern:*

Be it known that I, OSCAR P. ERHARDT, a citizen of the United States, residing at West Haven, county of New Haven, State of Connecticut, have invented certain new and useful Improvements in Beverage Mixers, of which the following is a full, clear, and exact description.

This invention relates to apparatus for agitating liquids, and it has particular reference to a beverage mixer in which the agitating or stirring element is operated by an electric motor, the motor being supported above the glass or other container and having a depending stirrer carried by the motor shaft and adapted to extend into the glass.

The primary object of the invention is to provide a simple, efficient, readily portable beverage mixer. More particularly, it is aimed to furnish a device in which the motor is not limited in its use to beverage mixing purposes, but can be readily detached from the other parts of the apparatus when it is desired to employ it for other purposes.

Another object of the invention is to provide improved means for supporting the motor above the glass.

Still another object is to provide a beverage mixer or like device having a supporting stand and motor member which can be very readily interconnected and disconnected.

To these and other ends, the invention consists in the novel features and combinations of parts to be hereinafter described and claimed.

In the accompanying drawing:

Fig. 1 is a side elevation of a beverage mixer embodying my improvements, showing the glass in vertical central section;

Fig. 2 is a section on line 2—2 of Fig. 1 looking in the direction of the arrows;

Fig. 3 is a top plan view of the stand, the motor being removed; and

Fig. 4 is an end view of the motor member with the handle partly broken away.

The improved beverage mixer consists mainly of a supporting stand which may be readily placed on the table above a glass containing liquid to be mixed, and a motor member supported by said stand above the glass and having a stirring element or agitator on its shaft depending into the glass. In the particular form shown, the stand 5 is formed of a tripod having wire supporting legs 6, three in number, and preferably the wires from which the legs are made will be bent at their lower ends to form loops 7 acting as supporting feet; but the number and arrangement of the legs of the spider-like stand or frame may be varied, and, in fact, the whole character of the stand may be varied considerably in some aspects of the invention. In the example shown, the wire legs 6 are of such length as to extend at their upper ends above the top edge of the ordinary glass, and the upper middle part of the stand, constituting the body thereof, is formed of a sheet metal plate or disk 8 to which the upper ends of the legs 6 are secured. In the form shown, the upper ends of the legs are bent inwardly and laterally at 9 so as to underlie the plate 8, to the under surface of which they are secured by suitable means as by soldering. The plate 8 serves as a support for an electric motor which, in the form shown, consists mainly of a motor member 10 and a laterally extending handle 11. The motor member 10 has a vertical shaft 12 extending downward from the lower end thereof, the lower end portion of the motor member being supported on the body part 8 of the spider or stand, which body part has a central opening 13 through which the motor shaft may pass as the motor is lowered into position on top of the body 8. The motor shaft 12 carries at its lower end a stirrer or agitating element 14, having a stirring blade 15 or the like at the lower end thereof which extends down into the glass 16, as shown in Fig. 1. The opening 13 of the body 8 is sufficiently large to permit the stirring blade 15 of the stirring element to pass downward through it when the motor is lowered into the operative position, in which it is supported on the spider. The stirring element 14 may advantageously consist of a shank or rod having a sleeve-like portion 14$^a$ at its upper end detachably secured to the motor shaft 12 by a set screw 14$^b$. By this construction, the stirrer can be readily applied to and removed from the motor shaft. Preferably, the motor member 10, when supported on the body 8 of the spider, is secured thereto in a detachable manner, and in the present instance the motor member and spider body are provided with detachable interlocking means for supporting the motor member firmly on the spider in a detachable manner. In the particular case illustrated, the lower face of the motor member is provided with machine screws 17 arranged at equal distances about the shaft and adapted to engage key hole slots 18 in the annular body 8.

The operation of the improved beverage mixer will be more or less obvious from the foregoing description. The stand and motor member are normally separate so that the motor member can be used for a variety of purposes, with different tools or attachments applied to the motor shaft 12. When it is desired to mix a beverage in a glass, the glass is placed under the stand or the stand is placed over it, and the motor member is then placed down on the stand in the manner shown in Fig. 1. Before placing the motor member on the stand, however, the stirring element is applied to the motor shaft, and when the motor member is lowered onto its support said element 14 passes through the clearance opening 13. The heads of the screws 17 are engaged in the key hole slots 18 and the parts are interlocked by a slight relative turning movement which causes the body 8 of the stand to be tightly clamped between the heads of the respective screws and the opposing face of the motor member. The motor member is thus firmly supported on the stand and the rotation of the stirring element can be commenced by starting the motor in the usual manner. The motor can be very readily handled by means of the laterally extending handle 11. It should be noted that the legs 6 of the stand, in addition to supporting the motor above the glass, serve also to assist in positioning the stirring element 14 substantially centrally within the glass. This is due to the arrangement of the legs 6, so that they will receive the glass between the same only when it is positioned under the center of the supporting stand.

Various changes may be made in the details of the structure herein described without departing from the scope of my invention. For example, as regards the headed machine screws 17 or the like projecting from the motor face, the character of the article or attachment detachably secured to the motor face by said screws or equivalents may be considerably varied.

In the form illustrated, the motor has a downwardly extending boss 19 at its lower end around the motor shaft, which extends into the opening 13 and which substantially corresponds in diameter with said opening, so as to produce a fairly snug fit and assist in preventing relative lateral displacement of the motor member and stand. Of course, the shifting of the screws in the key hole slots does not displace the parts as the arrangement is such that in doing this the members turn about the axis of the motor shaft and boss.

What I claim is:

1. In a device such as described, a portable spider-like stand adapted to be set over a glass, said stand having a substantially flat top and supporting and positioning legs connected thereto and a motor member supported on top of the stand above the glass and having a vertically extending shaft, and a stirring element attached to the motor shaft below the top of said stand and arranged to extend downward into the glass.

2. In a device such as described, a spider-like stand adapted to be set over a glass and having an opening approximately at the center thereof, a motor member having a shaft with a stirring element thereon adapted to extend downward through said opening, the body of said motor member adapted to rest on the upper surface of said stand, and means for detachably securing the motor member on the stand.

3. In a device such as described, a spider-like stand having a body plate 8 and supporting legs 6 secured to the body plate, said plate 8 having a central opening 13, and a motor member 10 adapted to be supported on top of the plate 8 and having a bearing boss extending through the opening 13.

4. In a device such as described, a spider-like stand having a body plate 8 provided with spaced legs, said plate provided with a central opening 13, a motor member 10 adapted to be supported on top of the plate 8 and having a rotating stirring element 14 movable through the opening 13, and means for securing the motor member on top of the body plate.

5. The combination with a motor member having a vertical shaft and a casing, said shaft extending downward beyond the casing, of a detachable stand for said motor member having a substantially flat upper surface on which the lower face portion of the motor member casing rests, said stand having a clearance opening for the downwardly extending portion of the motor shaft.

6. The combination with a portable motor member having a shaft, and a bearing boss therefor of a plate lying against one face of said motor member, and having an opening for clearing said shaft and boss, and means for interlocking and releasing said plate and motor member by relative turning movement thereof.

7. The combination with a motor member having a casing and a shaft projecting from said casing, of screws projecting from one face of the casing around said shaft, and an attachment applied to the casing by means of said screws, said attachment having key hole slots to engage said screws.

8. In a device such as described, a stand adapted to be set over a glass, a motor member set on top of the stand and having a depending stirring element extending into the glass, and means for interlocking the stand and motor member by relative turning movement thereof.

9. The combination with a motor member having a casing, a shaft, and a bearing boss for the shaft, projecting outwardly from one face of the casing, of a plate lying alongside the face of the motor casing, and having an opening in which said boss snugly fits, and means for detachably securing the plate to the casing.

10. In a device such as described, a stand adapted to be set over a glass, consisting of a plate provided with symmetrically placed downwardly extending legs, and a motor member mounted upon said stand and having a depending stirring element positioned to extend into the glass, said legs being constructed to position said glass directly below said stirrer and being longer than said stirrer to support the stand independently of the glass.

In witness whereof, I have hereunto set my hand on the 4th day of December, 1917.

OSCAR P. ERHARDT.